Dec. 19, 1961 F. L. COMBS, SR 3,013,462
CHORD SELECTORS FOR CHORD ORGANS
Filed April 3, 1958 2 Sheets-Sheet 2
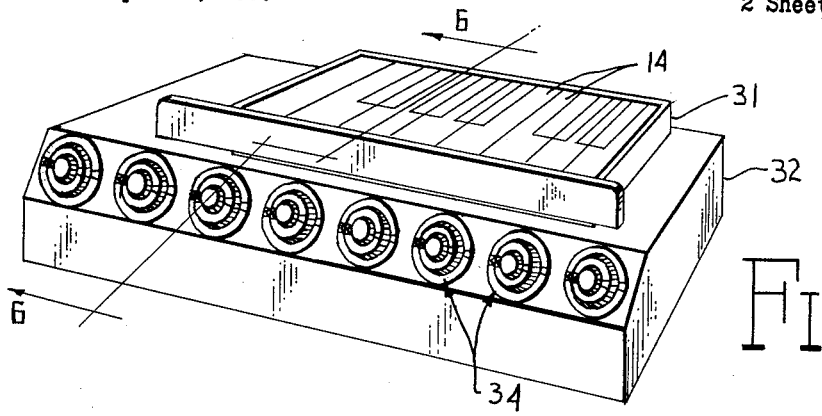
FIG. 5.
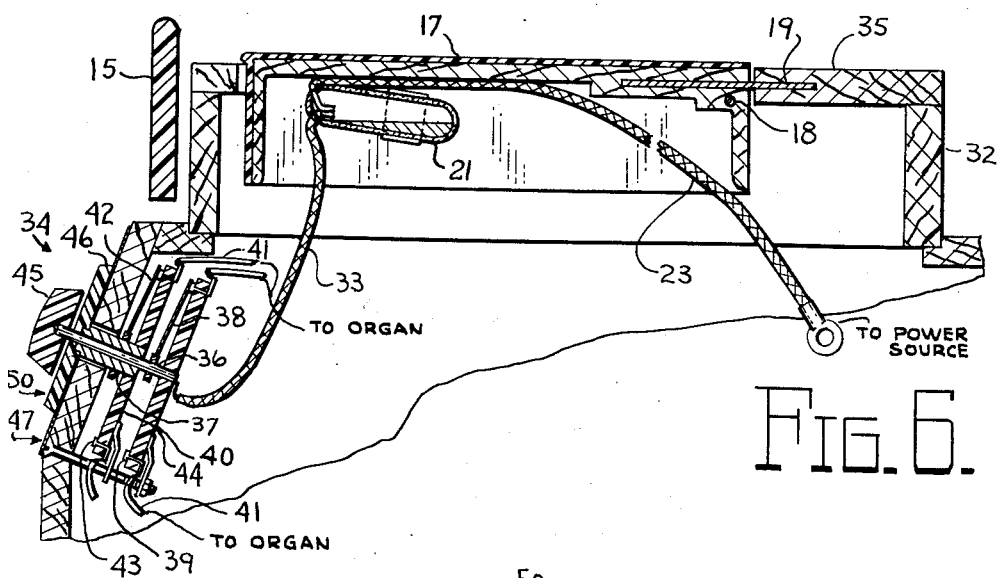
FIG. 6.
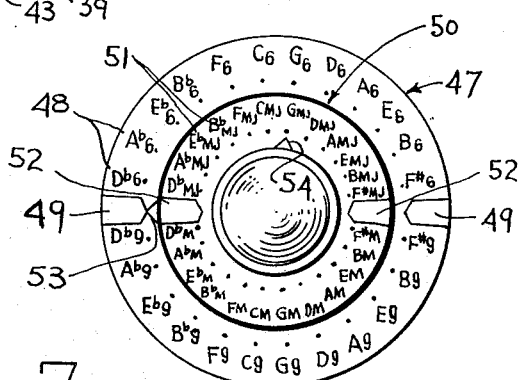
FIG. 7.
INVENTOR.
FRAYNE L. COMBS
BY
ATTORNEYS

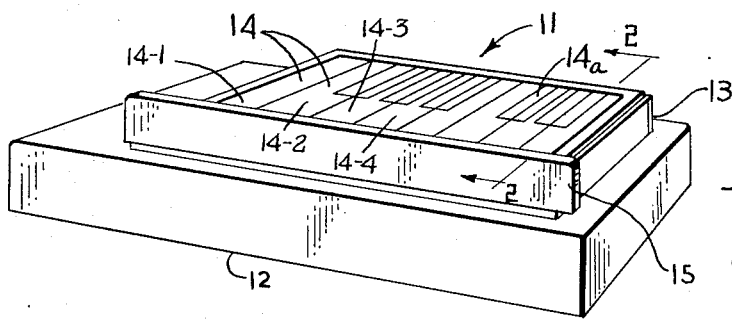
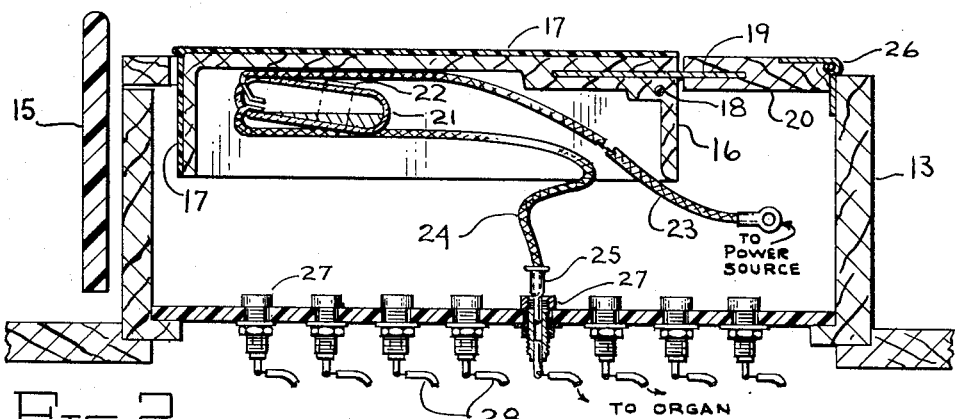
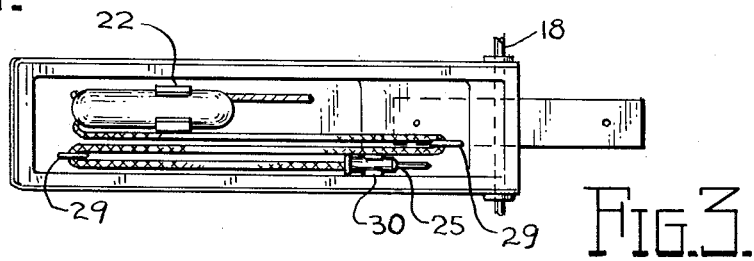

United States Patent Office 3,013,462
Patented Dec. 19, 1961

3,013,462
CHORD SELECTORS FOR CHORD ORGANS
Frayne L. Combs, Sr., Box 293, Wapakoneta, Ohio
Filed Apr. 3, 1958, Ser. No. 726,153
2 Claims. (Cl. 84—443)

This invention pertains to chord organs and more particularly to chord selectors for such organs.

Chord organs are becoming increasingly popular because of the wide variations in musical sounds obtainable therefrom and because of the relative ease in playing them. A beginner can play an almost unlimited number of compositions in a matter of a few weeks which is at least partially brought about by the unique arrangement that such organs have for playing chords. The melody is played with the right hand and the chords are played with the left, simply by pushing one of the plurality of chord buttons rather than playing several keys or digitals as is the usual practice. There are generally 96 of these chord buttons, each of which, when depressed, actuates a chord-producting apparatus that plays a given chord.

In present chord organs, the large number of buttons tends to appear somewhat complicated and may confuse the novice. A given chord button is also hard to locate until one is thoroughly familiar with the button arrangement. Further, the buttons must be spaced rather closely together to contain them within a reasonable area, with the result that people with large fingers frequently have difficulty pressing the correct button without others getting in the way.

Because of the above difficulties, the large number of chord buttons are less than desirable, particularly in view of the fact that of the 96 chord buttons on most such organs, only three of these are used over half of the time when playing in any given key. Further, almost all musical selections have eight or less different chords, and often four or less.

The present invention pertains to a new chord selector for playing chords that overcomes the above disadvantages. With chord selecting apparatus according to the invention, a keyboard system is used, utilizing but a small number of finger-operated keys or digitals that can be arranged similarly to piano keys or digitals but can be played similarly to chord buttons. The use of only, say, eight digitals rather than 96 buttons enables a given chord to be selected more easily and played more easily, particularly by people with large fingers. Any desired chord can be selected for any given digital so that chord will be emitted when the digital is depressed. Thus, for a given musical selection, the chord-producing apparatus corresponding to the chords employed in that selection, are each connected to separate digitals which are depressed by the organist at the appropriate times while playing the selection.

It is, therefore, a principal object of the invention to provide apparatus for selecting chords that requires only a small number of digitals.

Another object of the invention is to provide a chord selector for a chord organ that is simple and easier to use.

Other objects and advantages of the invention will be suggested by the following detailed description of a preferred embodiment thereof, reference being made to the accompanying drawings, in which:

FIG. 1 is a view in perspective of a platform and a chord selector according to the invention that can be employed with a chord organ;

FIG. 2 is an enlarged view in cross section taken along line 2—2 of FIG. 1 and showing digital and selecting means for connecting the digital to a chord-producing apparatus;

FIG. 3 is a bottom view of the digital shown in FIG. 2;

FIG. 4 is a plan view of a portion of the selecting means, including a plurality of jacks, employed with the digitals shown in FIGS. 1–3;

FIG. 5 is a view in perspective of a platform and an alternate chord selector according to the invention;

FIG. 6 is an enlarged view in cross section taken along line 6—6 of FIG. 5 and showing a digital and alternate selecting means, including a selector switch, therefor; and FIG. 7 is a front view of the selector switch shown in FIG. 6, showing dial faces useable therewith.

Referring to the drawing and more particularly to FIG. 1, a chord selector 11 includes a platform 12 that is mounted on a chord organ (not shown), a digital housing 13, chord-actuating members or digitals 14, and a chord bar 15. This unit can be located at the left-hand side of an organ keyboard in the same position as is the present chord button arrangement on many organs. The chord bar 15, as with present organs, is struck with the base of the operator's hand and controls the volume of the chord being played when one of the digitals 14 is depressed with a finger of the same hand. Eight digitals are shown in the present embodiment that are used to replace the large number of buttons required for the conventional chord organ. A lesser number of digitals can be used but the number of chords that can be played in a given musical selection is limited by the number of digitals, because each digital plays one chord for a given setting of the selector means. If desired a plurality of fake black digitals 14a can be used to simulate a familiar keyboard. The digitals 14a can be made operative, however, in the same manner as are the digitals 14, if a larger number of chord-selecting digitals are desired. For more professional-type organs, it may be desired to use, say, 12 or 14 of such digitals. My invention is not, of course, to be limited to any particular number of digitals.

FIGS. 2 and 3 show one of the digitals 14 which includes a hollow wooden casing 16 with an open bottom. Decorative sheets 17 are used to cover the exposed surfaces of the casing 16; alternately, the digitals 14 can be integral plastic units. The digitals 14 are pivotally supported by any suitable means such as a pin 18 which is held by each side wall of the housing 13. A leaf spring 19 is provided for each digital and extends into both a lid 20 of the housing 13 and the inner end of the digital 14 to cause the digital to return to its original position after being depressed. The digital 14 has a mercury switch 21 mounted on a clip 22 in the casing 16. Although a conventional switch can be used, the mercury switch has many advantages—it will not wear out, it is silent, it requires substantially no force to be opened or closed, and it is both compact and dependable. A flexible wire 23 extends from a terminal of the switch 21 to an electrical power source (not shown) and a second flexible wire 24, with a jack plug 25, is connected to the other terminal of the mercury switch.

The lid 20 has hinges 26 connected to the housing 13 which enables the entire lid and digitals 14 to be raised. When the lid 20 is raised, a multiplicity of female jacks 27 are exposed, one for each of the chords the organ can play, say, 96, as shown in FIG. 4. These jacks are laid out in eight horizontal rows each of which corresponds to a chord group, as from Major 6th to Minor 7th. Each row contains twelve jacks which correspond to twelve keys, from D flat to F sharp. Wires 28 connect the individual jacks 27 to chord-producing apparatus that is known in the prior art and forms no part of the present invention. The jack plug 25 for any given digital 14 is placed in an appropriate one of the female jacks 27 according to the chord desired to be played by the associated digital. The organ will then play that particular chord when a male plug 25 is inserted in the female jack corresponding to the chord, and when the digital 14 associated with the plug 25 is depressed to complete a circuit through the mercury switch 21 and the wires 23 and 24. The flexible wires 24 of any digitals 14 which are not being used can be wound around hooks 29 within the casing 16, and the plug 25 hung on a clip 30.

In operation, the chords that are used in a musical selection to be played are first determined. This is a simple matter for typical chord organ sheet music because the chords used in the selection are designated by a number and name in a box at one corner of the sheet music. For example, 1=C Major, 2=G Major, 3=D Seventh, and 4=A Seventh. These numbers 1–4 are also located on the sheet music along with the melody notes to be played with the right hand. The chord corresponding to a number is played by the organist whenever that number appears alongside the notes being played. With the present chord selector, the organist, upon ascertaining the chords to be used, lifts the lid 20 and places the plug 25 of, say, the first digital, designated 14–1, into the female jack designated 27–1 in FIG. 4. The male plug 25 for the second digital, designated 14–2, is placed in the appropriate female jack, designated 27–2. The male plugs 25 of the digitals 14–3 and 14–4 are similarly placed in the female jacks 27–3 and 27–4. When the music is being played, the appropriate digital 14–1 to 14–4 is struck when the appropriate number 1–4 appears on the sheet music and the corresponding chord is thereby produced by the associated chord-producing apparatus.

Each of the digitals 14 can have a number from 1–8 imprinted thereon or such numbers can be placed on tape and removably adhered to the digitals. Thus, it may be desired to play the above mentioned four chords on the last four digitals of the organ rather than the first four. In this case, the male plugs 25 of the last four digitals 14 are placed in the appropriate female jacks 27 of the chords numbered 1–4 and removable number tags from 1–4 are then placed on the last four digitals. Such numbers are not necessary, however, after one becomes somewhat familiar with the organ and method of playing.

When a different musical selection or composition is to be played, the male plugs 25 are changed to the jacks 27 corresponding to the chords used in the new composition or selection. However, in most instances when playing in a given key, at least some of the chords remain the same and, in such cases, none or perhaps only one of the plugs 25 need be changed or added.

A modified chord selector embodying the principles of the invention is shown in FIGS. 5–7. In this embodiment, a suitable number of the digitals 14 are located in a housing 31 mounted on a platform 32 with the chord bar 15 again located in front of the digitals 14. Wires 33, which correspond to the wires 24 of the first modification are now permanently connected to selector switches 34. The digitals 14 are pivotally supported by the pin 18 and are provided with the same leaf springs 19 which are connected to a lid 35 that is affixed to the housing 31, this arrangement being substantially the same as in the first form. The mercury switches 21 are also provided for each of the digitals 14 and have one terminal again connected through the flexible wire 23 to an electrical power source (not shown) and are connected through the other flexible wire 33 to the selector switch 34.

The selector switches 34 are used to connect the digitals 14 to any one of a number of chords. In the form shown, the selector switches are of the two-gang type with 24 "live" positions and two "dead" positions for each gang. The flexible wire 33 is electrically connected to a solid shaft 36 of a first gang and also to an annular shaft 37 of a second gang which is in electrical contact with the first shaft. The shaft 36 is affixed to a contact arm 38 that connects the shaft to any of twenty-four contacts 39 and two dead positions positioned around the periphery of an insulating plate 40. A wire 41 is connected to each contact and to the same electrical chord-producing apparatus as used in the first embodiment. The annular shaft 37 also has a contact arm 42 extending therefrom and which contacts any of twenty-four contacts 43 and two dead positions located on an insulating plate 44. These contacts 43 are also connected by the wires 41 to other of the chord-producing apparatus. The central shaft 36 is turned by a small knob 45 and the annular shaft 37 is turned by a large annular knob 46. A first dial face 47 is located on the platform 32 and has, in the particular instance, twenty-four chord designations 48 (FIG. 7) and two dead spots 49 that correspond to the contacts 43 and the dead spots on the insulating plate 44. A second dial face 50 is located on the outer surface of the large knob 46 and also has twenty-four chord designations 51 and two dead spots 52 that correspond to the contacts 39 and the dead spots on the insulating plate 40. A pointer 53 is located on the large knob 46 and a pointer 54 is located on the small knob 45. When either of the pointers is positioned toward a chord designation 48 or 51 and the corresponding digital 14 is depressed, a circuit is completed through the flexible wire 23, the switch 21, the wire 33, one of the shafts 36 or 37, one of the contact arms 38 or 42, one of the contacts 39 or 43, and one of the wires 43 corresponding to the contact. Current is thereby supplied from the source of power to the appropriate chord-producing apparatus.

It will be readily understood that various selector switches corresponding to various chord designations can be employed. With the arrangement illustrated, two chord groups are arranged on each of the dial faces so that four chord groups are covered by one of the digitals 14 and one of the selector switches 34. As shown in FIG. 7, the Major 6th chord group and the Ninth chord group (refer to FIG. 4) are located on the dial 47 and the Major chord group and Minor chord group are located on the dial 50. Thus, any chord from D flat to F sharp Major 6th, from D flat to F sharp Ninth, from D flat to F sharp Major, and from D flat to F sharp Minor can be played by, say, the first digital 14 designated 14–1. The dials of the next three digitals 14–2 to 14–4 can have a similar arrangement to play chords in the same four chord groups, Major 6th, Ninth, Major, and Minor. The dials of the last four digitals 14–5 to 14–8 can be arranged to play any chord in the last four chord groups, Seventh, Diminished, Augmented, and Minor 7th. With this arrangement, any four chords in a chord group, the horizontal rows, can be played in the same musical selection without changing the dials. In another possible arrangement, the selector dials for the digitals 14–1 and 14–2 can cover the first four chord groups Major 6th to Minor, the dials for the next four digitals 14–3 to 14–6 can cover the intermediate four chord groups, Major to Diminished, and the dials for the last two digitals 14–7 and 14–8 can cover the last four chord groups, Seventh to Minor 7th. In this manner, any six chords in one of the chord groups Major, Minor, Seventh, or Diminished, can be used in any one musical selection.

In operation, the organist determines the chords to be used in a given musical selection by viewing the box at the corner of the musical sheet which designates these chords. Using the same example as previously used, if chord 1=C Major, 2=G Major, 3=D Seventh, and 4=A Seventh, the selector switch for the digital 14–3 can be used to play the C Major chord by turning the pointer 54 to C Major designated on the dial face 50 and turning the other pointer 53 to one of the dead spots 49. The dead spots are used to keep the digitals from actuating two chords at the same time, although no harm results to the organ if this is accidentally done. The selector switch for the digital 14–4 is similarly turned to play the G Major chord by setting the appropriate pointers. The selector switches for the digitals 14–5 and 14–6 are similarly operated to play the D Seventh and A Seventh chords. If desired, removable numbers can then be placed on the digitals 14–3 to 14–6 to number these digitals 1 to 4 respectively. These four digitals are individually struck when the corresponding number appears on the sheet music, in the same manner as the digitals 14 shown in the previously-discussed embodiment. Where for example, most of the musical selections use only, say, four chords, four of the digitals 14 can be spaced slightly from the other four digitals and, preferably, closer to the keyboard to form a separate, simple keyboard, in effect.

When a different musical selection is to be played the chords that are added or changed in the music can also be added or changed for the digitals simply by changing the pointers on the appropriate selector switch dials.

In its basic form the invention comprises a plurality of digitals arranged at one side of the main keyboard. Each of these digitals closes a switch, preferably a mercury switch, when depressed. A suitable wire is attached to each of the digitals and means are provided for selectively connecting these wires to a desired chord-producing apparatus.

Various modifications of the invention will be apparent from the above description and drawings. Such modifications can be incorporated without departing from the scope of the invention, if they are within the scope of the depending claims.

What I claim is:

1. In a chord organ having a plurality of electrical chord-producing apparatuses, means for selectively activating any of said apparatuses which comprises a switch having an upper and a lower position, said switch being open in the upper position and closed in the lower position, means connecting a terminal of said switch to a source of current, a plurality of jacks, means connecting each of said jacks to a chord-producing apparatus, a plug insertable into any of said jacks, and means connecting said plug to the other terminal of said switch.

2. In a chord organ having a plurality of electrical chord-producing apparatuses, means for selectively activating any of said apparatuses comprising a plurality of depressible switches, each having an upper and a lower position and being open in the upper position and closed in the lower position, means connecting a terminal of each of said switches to a source of current, a plurality of selector switches, each having a plurality of contacts, there being one selector switch for each of said depressible switches, means connecting each of said contacts of each of said selector switches to a different electrical chord-producing apparatus, each of said selector switches including means connecting any of said contacts to the other terminal of its associated depressible switch, and manually-operable means connected to said contact connecting means for controlling said contact connecting means to connect individually each of said depressible switches to any of a plurality of the chord-producing apparatuses independently of the other depressible switches.

References Cited in the file of this patent

UNITED STATES PATENTS

| | | |
|---|---|---|
| 1,956,350 | Hammond | Apr. 24, 1934 |
| 2,569,525 | Hill | Oct. 2, 1951 |
| 2,645,968 | Hanert | July 21, 1953 |